United States Patent [19]
Brown

[11] Patent Number: 6,119,710
[45] Date of Patent: Sep. 19, 2000

[54] METHOD FOR WIDE RANGE GAS FLOW SYSTEM WITH REAL TIME FLOW MEASUREMENT AND CORRECTION

[75] Inventor: Timothy R. Brown, Poway, Calif.

[73] Assignee: Cyber Instrument Technologies LLC, Poway, Calif.

[21] Appl. No.: 09/318,880

[22] Filed: May 26, 1999

[51] Int. Cl.[7] ..................................... G05D 7/06
[52] U.S. Cl. ..................... 137/14; 137/486; 137/487.5
[58] Field of Search ..................... 137/14, 486, 487.5

[56] References Cited

U.S. PATENT DOCUMENTS

| | | | |
|---|---|---|---|
| 1,097,834 | 5/1914 | Anderson . | |
| 2,015,839 | 10/1935 | Brown | 73/167 |
| 3,958,443 | 5/1976 | Berrettini | 73/3 |
| 4,253,156 | 2/1981 | Lisle et al. | 364/571 |
| 4,285,245 | 8/1981 | Kennedy | 73/861 |
| 4,718,443 | 1/1988 | Adney et al. | 137/8 |
| 5,003,810 | 4/1991 | Jepson et al. | 73/3 |
| 5,072,416 | 12/1991 | Francisco, Jr. et al. | 364/571.01 |
| 5,129,418 | 7/1992 | Shimomura et al. | 137/486 |
| 5,307,668 | 5/1994 | Vander Heyden | 73/30.02 |
| 5,394,755 | 3/1995 | Sudo et al. | 73/861 |
| 5,410,495 | 4/1995 | Ramamurthi | 364/511.05 |
| 5,497,316 | 3/1996 | Sierk et al. | 364/140 |
| 5,524,084 | 6/1996 | Wang et al. | 364/510 |
| 5,576,487 | 11/1996 | Gimson | 73/204.11 |
| 5,712,425 | 1/1998 | Hecht et al. | 73/118.2 |
| 5,744,695 | 4/1998 | Forbes | 73/1.35 |
| 5,827,977 | 10/1998 | Ortiz et al. | 73/861.42 |
| 5,865,205 | 2/1999 | Wilmer | 137/2 |
| 5,968,588 | 10/1999 | Sivaramakrishnan | 427/8 |

FOREIGN PATENT DOCUMENTS

WO97/ 9/1997 WIPO .

*Primary Examiner*—Gerald A. Michalsky
*Attorney, Agent, or Firm*—Dan Hubert & Assoc.

[57] ABSTRACT

A gas delivery system accurately measures and optionally regulates mass flow rate in real time. A fluid conduit connects an inlet valve, calibration volume, flow restrictor, and outlet valve in series. Pressure and temperature sensors are coupled to the calibration volume. One or more pressure sensors may be attached across the flow restrictor. Alternatively, an absolute pressure sensor may be attached upstream of the flow restrictor. One embodiment of differential pressure sensors comprises a floating reference differential pressure sensor, including a first transducer attached to the fluid conduit upstream of the flow restrictor and a second transducer attached to the conduit downstream of the flow restrictor. In this embodiment, each transducer receives a reference pressure from a reference source, and optionally, after the calibration volume is charged, the floating reference differential pressure transducers are calibrated. When gas flow is initiated, differential and/or absolute pressure measurements are repeatedly taken, and a measured mass flow rate calculated thereon. Gas flow is adjusted until the measured mass flow rate reaches a target mass flow. Using the temperature/pressure sensors at the calibration volume, repeated calculations of actual flow rate are made to uncover any discrepancy between actual and measured mass flow rates. Whenever a discrepancy is found, the manner of calculating measured mass flow is conditioned to account for the discrepancy; thus, the measured mass flow rate more accurately represents the actual mass flow rate thereby providing an actual mass flow rate more accurately achieving the target mass flow rate.

37 Claims, 7 Drawing Sheets

METHOD FOR WIDE RANGE GAS FLOW SYSTEM WITH REAL TIME FLOW MEASUREMENT AND CORRECTION

BACKGROUND OF THE INVENTION

1. Field of the Invention

The present invention relates to manufacturing processes that require delivery of highly accurate amounts of gas to a processing chamber. More particularly, the invention concerns an improved gas flow system that accurately measures gas flow during the delivery of gas to a processing chamber. Added operations may be performed to regulate gas flow in accordance with these measurements.

2. Description of the Related Art

Many industrial processes, such as semiconductor manufacturing, rely on the accurate delivery of gasses to processing chambers, which are also called "reaction vessels." These chambers operate at various pressures, ranging from very high pressures in some cases to very low pressure in others. The accuracy and stability of the gas delivery system is critical to the overall manufacturing process. The chief goal of these systems is to accurately deliver a prescribed mass of gas. Since the relationship between mass and volume is not constant, and depends on other factors, purely volumetric flow control devices are not particularly useful.

Historically, engineers have used thermal mass flow controllers to control the flow of process gasses. In a complete gas delivery system, these thermal mass flow controllers are present in conjunction with various filters, pressure transducers, and control valves. These components are typically connected with steel tubing and various mechanical couplings. Typical connection schemes include welding, brazing, and various reusable fittings. Such fittings employ elastomeric or metal seals held in compression to form a vacuum-tight mechanical seal.

FIG. 1 shows an exemplary thermal mass flow controller 100. Gas first enters a gas inlet 102, and thereafter takes a flow path 103. After the inlet 102, gas flows around a bypass restrictor 104. Due to the pressure drop developed across the bypass restrictor 104, a fixed percentage of gas is diverted through a capillary tube 106, in a flow path 107. A multi-stage heater winding 105 is wrapped around the capillary tube 106. The winding 105 includes multiple terminals 105a–105c, which number three in this example. As the gas exits the capillary tube 106, it rejoins the main gas stream 108 to form a combined flow 111 that continues to a control valve 112. The control valve 112 includes valve windings and magnetics 114 and a plunger 116. The position of the plunger 116 regulates the amount of gas flow through the mass flow controller. Wider plunger settings permit more gas flow, whereas more constricted plunger settings permit less gas flow. Control electronics 122 regulate plunger position to achieve a desired gas flow, as described below. After the control valve 112, gas flows in a path 118 that finally exits the mass flow controller 100 at a gas outlet 120. The gas outlet 120 may lead to a processing chamber via further "downstream" plumbing (not shown).

The mass flow controller 100 works on the following principle. The mass of fluid flowing through the capillary tube 106 (flow 107) is directly proportional to the amount of flow around the bypass restrictor 104 (flow 108), and therefore provides a representative measure of the total flow through the device. Thus, the mass of gas in the flow 107 multiplied by a fixed number equals the mass of the gas in the flow 108. The sum of gas flows 107 and 108 equals the gas flow 103. The mass flow controller 100 may be manufactured for a specific flow range, taking into account relative size and configurations of the capillary tube, bypass flow path and control valve.

According to one method of mass flow measurement, electrical current is passed through the heater windings 105 from terminal 105a to terminal 105c. The resistance of the heater windings 105 changes in a known way with temperature. Thus, when the winding 105 is operated in a Wheatstone bridge, the terminal 105b can be used as a measurement point. As gas flows through the capillary tube 106, the thermal mass of the gas transfers heat from the first part of the winding (between terminals 105a–105b) to the second part of the winding (between terminals 105b–105c). The amount of mass flow determines the amount of thermal transfer, which results in a directly proportional voltage imbalance between the winding 105a–105b and the winding 105b–105c. This voltage imbalance represents the amount of mass flowing in the tube 106. With knowledge of the amount of mass passing through the capillary tube 106, the total amount of mass in the flow 103 is easily calculated as discussed above.

Different variations of this measurement principle have also been used. For instance, a single heater winding and two temperature measurement devices may be used to measure the thermal transfer due to flow. As another alternative, a variable amount of current may be directed through one or both of the heater windings in order to maintain a fixed temperature drop along the capillary tube due to flow.

In operation, control electronics 122 regulate plunger positioning under a closed loop feedback system. Namely, the electronics 122 compare detected mass flow (measured by the capillary tube 106) to desired mass flow (provided as input). Then, based on this comparison, the electronics 122 responsively narrows or opens the plunger 116 position.

Mass flow controllers are one of the most important parts of gas delivery systems. Unfortunately, known mass flow controllers can also one of the least reliable parts of such a system. Mass flow controllers have been manufactured with many different configurations of capillary tubes, windings, bypass restrictors, and control valves. Nonetheless, several different factors cause undesirable variations in mass flow calibration and performance. If any liquid or other contamination forms in the area around the bypass restrictor, the relationship between the flow 107 and the flow 103 varies, and the overall calibration of the device changes. Condensation forming in the bypass flow path or elsewhere in the flow path is another source of calibration error. Aging of the windings and the nature of the thermal contact between the windings and the outside of the tube cause long term calibration drift. Changes in chemical composition of the process gas as it is subjected to the winding heat can also affect the integrity of the process.

Another flow rate regulation system appears in U.S. Pat. No. 4,285,245 to Kennedy. Kennedy measures the pressure decrease in a measurement chamber of fixed volume, and calculates the rate of pressure decrease by dividing the measured pressure drop by time of drop. This calculated rate of fall is directly related to the volumetric flow rate. Although the Kennedy system may be useful for its intended purpose, it may prove inadequate for applications seeking to precisely control the mass flow rate. In particular, the mass of a gas is not always proportional to its volume, since this relationship can change under the influence of factors such as absolute pressure and temperature. Also, small incremental variations in mass flow rate can occur undetected in the Kennedy system because, as recognized by the present inventors, Kennedy lacks any continuous or real-time measurement and flow control means. Thus, the Kennedy approach may not be satisfactory for applications that seek to precisely control mass flow.

In the semiconductor manufacturing line, misdelivery of process gasses can be extremely costly. In some cases, if the process gas is incorrectly delivered to a silicon wafer in the process chamber, the wafer may be ruined. And, since economy warrants growing larger and larger silicon ingots, these large silicon wafers are more costly to scrap if damaged. Furthermore, in the event of such an error, its is expensive to repair or replace the mass flow controller and repeat the manufacturing run. In many cases, manufacturing downtime can result in lost revenues exceeding $125,000 per hour.

In view of these limitations, known mass flow controllers are not completely adequate for some applications due to certain unsolved problems.

SUMMARY OF THE INVENTION

Broadly, the present invention concerns an improved gas flow system that accurately measures gas flow during delivery of gas to a processing chamber. Added steps may be performed to precisely regulate gas flow in accordance with the flow measurements. The mass flow system includes a fluid conduit connecting an inlet valve, calibration volume, flow restrictor, and flow control valve in series. Pressure and temperature sensing devices are coupled to the calibration volume. Mass flow sensors are also located downstream of the calibration volume. In one example, the downstream mass flow sensors include a floating reference differential pressure sensor that includes two pressure transducers. A first transducer is attached to the conduit upstream of the flow restrictor, and a second transducer is attached to the conduit downstream of the flow restrictor. Each transducer receives a reference pressure from a reference source, and measures pressure relative to that reference pressure.

In operation, the mass flow system receives customer specification of a "target mass flow rate" or "set point," specifying a desired rate of mass flow in appropriate units such as standard cubic centimeters per minute (sccm). After, or prior to, receiving the set point, the calibration volume is charged and the reference pressure is adjusted to calibrate the floating reference differential pressure transducers. Next, gas flow is initiated. During the gas flow, measurements are repeatedly taken including absolute pressure measurements at the calibration volume and differential pressure measurements across the flow restrictor; these measurements are used to determine the "measured mass flow rate." If gas flow control is desired, gas flow is iteratively adjusted using appropriate control valves until the measured flow rate reaches the target mass flow rate. Using the temperature/pressure sensing devices at the calibration volume, repeated calculations of actual mass flow rate are made to uncover any discrepancy between actual and measured mass flow rates. Whenever a discrepancy is found, the manner of calculating measured flow rate is corrected "on the fly" to account for the discrepancy. If gas flow control is sought, gas flow rate is then adjusted until the measured mass flow rate (as corrected) matches the target mass flow rate.

Other embodiments of downstream mass flow sensor are also disclosed, such as a thermal mass flow sensor, a single diaphragm type pressure transducer mounted in parallel with the flow restrictor, or a single pressure sensing device mounted upstream of the flow restrictor.

Accordingly, in one embodiment the invention may be implemented to provide a method of operating a gas delivery mass flow measurement system. In another embodiment, the invention may be implemented to provide an apparatus, such as a gas delivery mass flow measurement system. In still another embodiment, the invention may be implemented to provide a signal-bearing medium tangibly embodying a program of machine-readable instructions executable by a digital data processing apparatus to perform operations for operating a gas delivery mass flow system. Another embodiment concerns logic circuitry having multiple interconnected electrically conductive elements configured to perform operations to operate a gas delivery mass flow system.

The invention affords its users with a number of distinct advantages. Chiefly, the invention ensures accurate process gas delivery by taking separate mass flow measurements during gas delivery, and comparing the measurements to more accurately measure (and optionally regulate) gas flow. Mass flow with the present invention is more accurate because the invention repeatedly measures gas flow and corrects these measurements, during "real time" actual gas delivery. The invention may be implemented in one embodiment to more accurately measure gas flow rate using floating reference differential pressure transducers. In contrast to the prior art, these floating reference pressure transducers provide a greater range of measurement and higher resolution. As another advantage, the floating reference pressure transducers may be used with corrosive process gasses, since transducers' delicate back sides are isolated through coupling to a reference conduit containing a safe gas at a carefully controlled pressure.

The invention is also beneficial in its broad application. In addition to applications in semiconductor manufacturing, the invention may also be used to accurately deliver gas for coating windows, metals, and other materials. The invention also provides a number of other advantages and benefits, which should be apparent from the following description of the invention.

DETAILED DESCRIPTION

Figure 1:
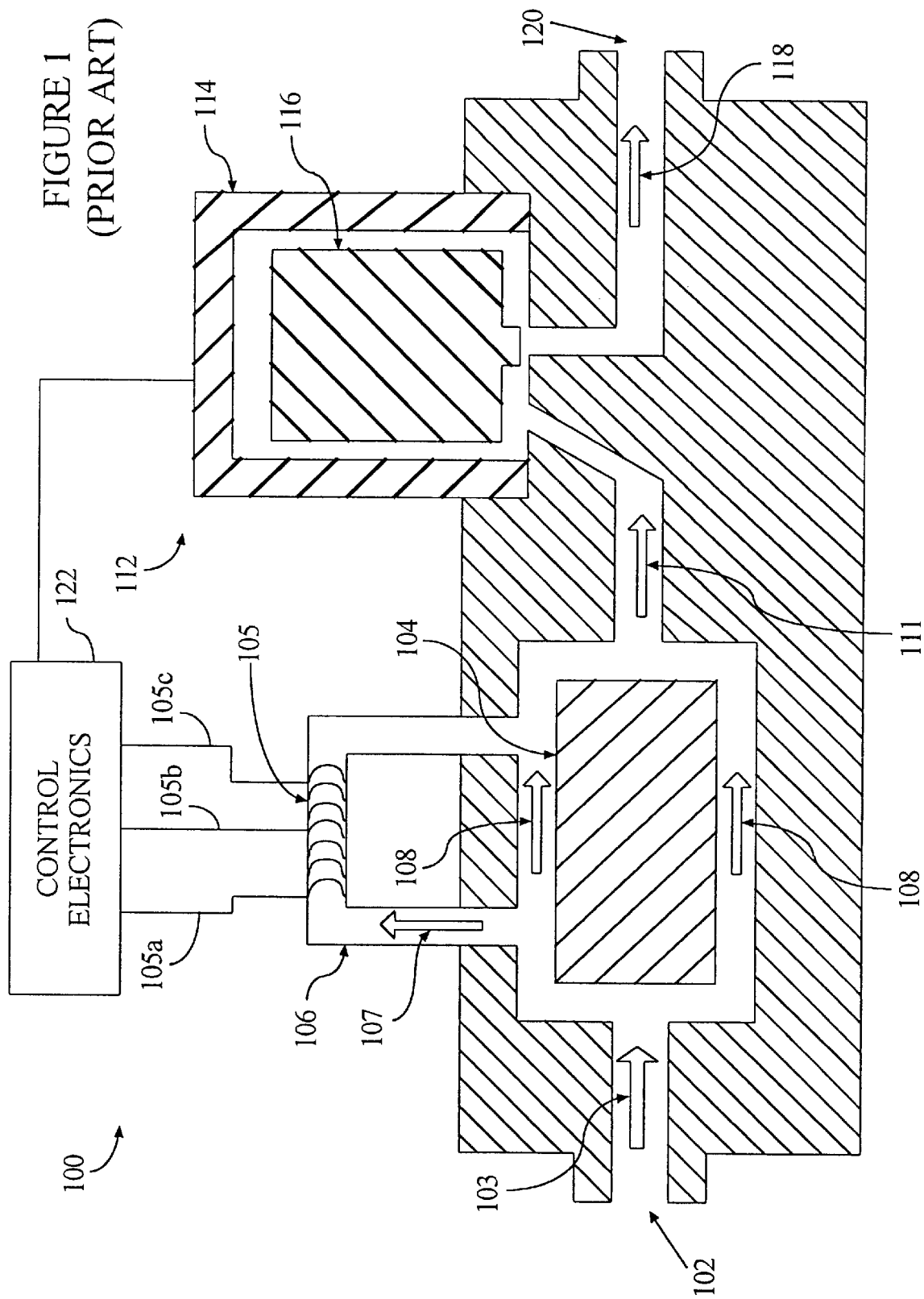
FIG. 1 is a block diagram of a known mass flow controller.

The nature, objectives, and advantages of the invention will become more apparent to those skilled in the art after considering the following detailed description in connection with the accompanying drawings. As mentioned above, the invention concerns an improved gas delivery mass flow system that accurately measures mass flow, corrects such measurements, and optionally adjusts gas flow during the delivery of process gas to the processing chamber. Such measurements are cooperatively made by one or more sensors at a downstream flow restrictor along with upstream sensors at the calibration volume.

ANALYSIS OF TWO STEP GAS FLOW TECHNIQUE

In contrast to thermal gas flow controllers, which use capillary tubes as discussed above, another type of delivery system is shown in U.S. Pat. No. 5,865,205 to Wilmer, issued Feb. 2, 1999. Wilmer uses a reservoir of known volume, which is filled with gas upon the initiation of a process "recipe" step. The temperature and pressure of the gas in the reservoir are measured to determine an initial mass of the gas residing within the reservoir. The flow of gas from the reservoir to the process chamber is metered by a variable flow control valve under control of a dynamic flow circuit said to be self-calibrating. After the flow of gas to the process chamber is terminated, the temperature and pressure of the gas residing in the reservoir is again measured to determine the final mass of gas residing in the reservoir. The initial mass and final mass of gas values are compared to determine the actual mass of gas released from the reservoir during the recipe step. This value serves as an input to a calibration servo loop to update a system calibration constant.

Wilmer therefore uses a two-step gas delivery process, where (1) gas is first delivered to the process chamber from the reservoir, and (2) post-delivery temperature and pressure of gas in the reservoir are measured after the gas flow is terminated. The post-delivery measurements are used to help calibrate the system "off-line," i.e., not in "real time."

Despite Wilmer's successful omission of capillary tubes and the associated limitations, the present inventors have nonetheless analyzed Wilmer's approach with an eye toward any possible improvements. In this endeavor, the inventors have considered the otherwise unrecognized limitation that Wilmer's approach, which corrects the setpoint and not the flow measurement itself, does not enable secondary monitoring devices or systems to receive an actual flow signal or value.

As another limitation, Wilmer's method of flow control requires that gas flow at sonic velocities through an orifice, thus eliminating the possibility of application for the delivery of process materials that suffer adverse effects from this exposure due to such factors as solution alteration, chemical dissociation, or other undesirable effects to the characteristics of the material.

As another limitation of the Wilmer's approach, gas flow controller calibration is performed infrequently, since Wilmer's gas flow controller calibration can only performed off-line, after the process run. Namely, Wilmer measures pressure and temperature of the gas remaining in the reservoir after the processing run to determine how much total gas actually flowed during the process run. Although useful in checking the accuracy of the flow measurements of the last run, this technique effectively limits recalibration to one time per process run. For those applications that would benefit from more frequent calibration, Wilmer's approach may be inadequate. Furthermore, Wilmer's approach is wholly inadequate for single run gas delivery processes, where any post-delivery calibration is moot.

HARDWARE COMPONENTS & INTERCONNECTIONS

System Architecture

Introduction

Figure 2:
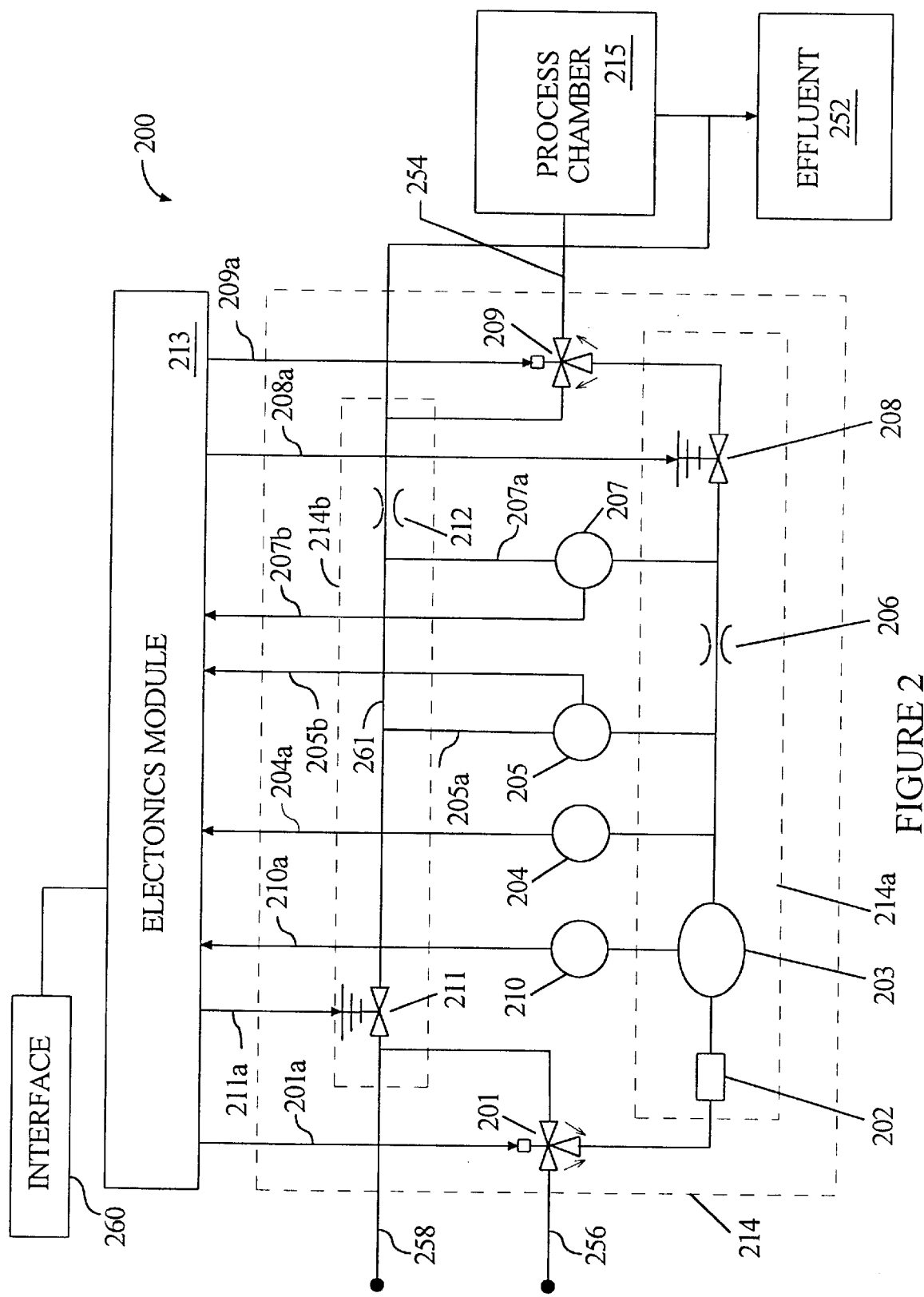
FIG. 2 is a block diagram showing the hardware components and interconnections of a wide range gas delivery mass flow control system with real time flow measurement, regulation, and correction using floating-reference differential pressure transducers, in accordance with the invention.

One aspect of the invention concerns a gas flow system, which may be embodied by various hardware components and interconnections as shown by the system 200 of FIG. 2. The system 200 includes a flow path 214, electronics module 213, a process chamber 215, and an effluent outlet 252. Broadly, the flow path 214 precisely directs a process gas, at a user-selected mass flow rate, into the process chamber 215 for use in semiconductor manufacturing, coating, or other processes occurring in the chamber 215. At other times, the flow path 214 directs gas into the effluent outlet 252 to purge gas from the components of the path 214.

The electronics module 213 controls various electrically operated components in the flow path 214, and receives electrically represented measurements from other components. In the following description, the electronics module 213 is coupled to these components by electrically conductive wires or busses. However, other suitable connection means may be used, such as fiber optic lines, wireless transmission using light, radio waves, sound etc.

Process Chamber & Effluent Outlet

During a process run, the process chamber 215 is the destination for process gas from the flow path 214. In the process chamber 215, the process gas interacts with materials that have been placed in the process chamber 215 for this purpose. Such interaction may involve coating, reacting, etching, deposition, chemical bonding, and the like. As an example, process gas from the path 214 may be applied to semiconductor materials in the chamber during the process of manufacturing integrated circuits, flat panel displays, and the like. As another example, process gas from the path 214 may be used to coat windows, metals, plastics, or other completely different materials.

The process chamber 215 comprises a vessel of sufficient size to hold the materials to be treated. The construction of process chambers, such as those used in semiconductor manufacturing, are well known in the art and therefore need no further description.

The effluent outlet 252 provides a place to direct gas from the flow path 214. As one example, the path 214 may be purged by flushing a utility gas through the path 214 and ultimately out the effluent outlet 252. The effluent outlet 252 also has another use. During a manufacturing run, a utility gas may be directed through a "reference conduit," and ultimately out the effluent outlet 252. This is useful during calibration and use of certain floating reference pressure transducers, discussed below.

In some cases, and if gasses from the path 214 are nontoxic, the effluent outlet 252 may be a vent or exhaust port leading into the ambient air. In other cases, the effluent outlet 252 may include a suitable storage facility, a vacuum pump or other plumbing to suitable evacuation and discharge means. The construction of effluent outlets, such as those used in semiconductor manufacturing, are well known in the art, and no further description is required.

Although, the flow path 214 and electronics module 213 implement various features of the invention, other components, such as process chamber 215, are depicted only for the purposes of demonstrating use of the invention.

Flow Path

The flow path 214 conducts a process gas as well as a utility gas, and includes a process gas path 214*a* and a utility gas path 214*b*. The process gas is directed to the process chamber 215, where it is applied to materials located there.

To provide some examples, the process gas may be nitrogen, oxygen, ozone, silane, argon, chlorinated fluorocarbons, etc. The utility gas is used for purposes other than application to materials in the process chamber 215. For example, the utility gas may be routed through the flow path 214a into the effluent outlet 252, thereby purging the flow path 214a.

In another application, while the process gas passes through the flow path 214a, the utility gas may be applied under pressure in flow path 214b to calibrate floating reference differential pressure transducers in the flow path 214a, as discussed below. When used for this purpose, the utility gas preferably comprises a non-corrosive, pure, and water-free substance such as nitrogen. These qualities help ensure that the utility gas does not damage the floating reference differential pressure transducers' chemically-sensitive back sides, as discussed below.

Considering the flow path 214 in greater detail, the path 214 includes a utility gas inlet 258 leading to a "reference gas" flow path 214b. The path 214b includes an adjustable flow control valve 211, reference conduit 261, and flow restrictor 212. Optionally, the order of components in flow path 214b can be rearranged such that the flow control valve 211 and flow restrictor 212 are swapped in their locations placing the control valve 211 downstream and flow restrictor 212 upstream of reference conduit 261. These components and their operation are discussed in greater detail below.

In addition to the inlet 258 and flow path 214b, the flow path 214 includes a process gas inlet 256 coupled to a "process gas" flow path 214a. The inlets 256, 258 constitute an "upstream" end of the flow path 214, whereas the process chamber 215 and effluent outlet 252 constitute the "downstream" end. A three-way valve 201 selectively admits gas from the utility gas inlet 258 or the process gas inlet 256 into the process gas flow path 214a. The valve 201 switches between the inlet 256, the inlet 258, or neither inlet ("off") in response to electrical signals received from the electronics module 213 over a line 201a. Commercially available examples of suitable three-way valves include the Ultraseal Valves of Parker Corporation, and valves of Veriflo Corporation's Quantum line.

Continuing downstream from the valve 201 in the flow path 214a, there are various subcomponents, such as gauges, valves, and the like, interconnected in serial fashion by sealed conduits, such as metal tubes or other suitable plumbing. More particularly, the valve 201 is coupled to an optional filter 202, to filter out target contaminants such as moisture or particulates. A commercially available example of the filter 202 is the sintered stainless steel filter manufactured by Parker Corporation. The filter 202 leads to a calibration volume 203, which may comprise a cavity defined within a solid metal block assembly, as discussed below.

Optionally, a temperature sensor 210 may be coupled to the calibration volume 203 to measure the temperature of gas inside the calibration volume 203. The temperature sensor 210 sends an electrical representation of its temperature reading to the electronics module 213 over a line 210a. Although shown directly connected to the calibration volume 203, the temperature sensor 210 may be connected indirectly, at a site such as a nearby fluid conduit or another site that is sufficiently near the volume 203 and thermally connected to measure its temperature. Temperature measurement helps measure and account for various thermal effects, such as thermal expansion of gas during calibration, variations in process gas temperatures, and other properties. As a feasible but simpler alternative, the temperature sensor 210 may be omitted from the system 200. In this case, an assumption may be made that temperature is a constant value, such as ambient temperature.

An absolute pressure sensor 204 is operatively coupled to the calibration volume 203, or to conduit leading from the volume 203 (as illustrated), or another suitably proximate location to measure absolute pressure of gasses inside the volume 203. The sensor 204 sends an electrical representation of its pressure reading to the electronics module 213 over a line 204a. The absolute pressure sensor 204 measures "absolute" pressure because it operates by measuring pressure relative to absolute vacuum. Accordingly, the sensor 204 may comprise a diaphragm type device. Another purpose for this device is to measure the absolute pressure in accordance with flow restrictor 206 such that an average pressure may be determined for applications involving laminar flow. Therefore, in the illustrated embodiment, the absolute pressure sensor 204 is placed in proximate location to both calibration volume 203 and flow restrictor 206, so as to be operationally coupled to both, generally accomplished by maintaining conduit optimized for high fluid conductance and of relatively short length for this path between calibration volume 203 and flow restrictor 206. An example of a commercially available absolute pressure sensor is the Model-204 product from Setra Corporation.

Downstream of the calibration volume 203, the process gas flow path 214a passes through a flow restrictor 206. The flow restrictor 206 comprises a laminar flow element, a molecular flow element, a sonic nozzle, a sintered filter element, one or more orifices, a pinched tube, one or more capillary tubes, or another mechanism for restricting flow to suit the flow regime and measurement techniques discussed herein.

In this embodiment, shown as an example for application of gas flow in the laminar or molecular flow regimes, a differential pressure sensor is mounted about the flow restrictor 206. Namely, the differential pressure sensor includes a first floating-reference pressure transducer 205 upstream of the flow restrictor 206, and a second floating-reference pressure transducer 207 downstream of the flow restrictor 206. In contrast to the absolute pressure sensor 204, the floating-reference pressure transducers 205, 207 measure pressure relative to a controlled reference pressure provided on the reference conduit 261 in the flow path 214b. In this respect, the transducers 205, 207 are coupled to the reference conduit 261 by conduits 205a, 207a. The transducers 205, 207 are also coupled to the electronics module 213 by electrical lines 205b, 207b, for the purpose of sending an electrical representation of their respective pressure readings to the electronics module 213.

Each transducer comprises a diaphragm type manometer, such as a capacitance manometer. Diaphragm manometers use a diaphragm with two opposing sides, encased in a housing with one port coupled to each side of the diaphragm. One half of the housing (a "back" side) vents to the reference conduit 261 and the other half (a "front" side) vents to the flow path 214a. Each differential pressure transducer therefore measures the difference between the reference conduit pressure and the pressure at the flow path 214a. At a transducer's back side, a sensing device such as an electrode is coupled to the diaphragm to sense the diaphragm's position (and hence the relative difference in pressure upon the two sides). The sensing device may detect changes in capacitance, strain, light, magnetic input, or another property. Because of the electrode's sensitivity to contaminants, corrosive chemicals, and moisture, the back side of each transducer only encounters the clean, dry gas of the reference conduit 261 (via the conduit 205a or 207a).

In addition to the differential pressure that each transducer measures, the difference between the readings of the transducers 205, 207 constitutes another differential pressure reading; this represents the pressure drop across the flow restrictor 206. Examples of commercially available products to implement the differential pressure transducers 205, 207 include: Model-228 or Model-230 pressure transducers of Setra Corporation, Data Instrument's DeltaMate line, and other manufacturers such as MKS, Millipore, and Edwards.

The reference conduit 261 is set to a selected pressure by adjusting the flow control valve 211 to admit a desired amount of utility gas into the reference conduit 261 from the inlet 258. The flow control valve 211, and hence the pressure in the reference conduit 261, is controlled by electrical signals received by the electronics module 213 over the line 211a. The elevated pressure on the reference conduit 261 is possible due to the presence of the flow restrictor 212, which permits a pressure difference to exist between the reference conduit 261 (higher pressure) and the effluent 252 (lower pressure). Alternatively, the flow restrictor 212 may be placed upstream of the reference conduit 261 to permit a pressure difference to exist between the gas inlet 258 and the reference conduit 261, while the flow control valve 211, placed downstream of the reference conduit 261, controls the pressure in the reference conduit 261 in response to electrical signals received by the electronics module 213 over the line 211a.

The process gas flow path 214a also includes an adjustable flow control valve 208, whose setting determines the mass of gas flowing in the path 214a. The setting of the control valve 208 is regulated by the electronics module 213, through communications with the valve 208 over a line 208a. The flow control valve 211, as well as the flow control valve 208 and other flow control valves discussed herein, may comprise any suitable type of control valve, such as a solenoid actuator control valve, piezoelectric type control valve, thermally actuated control valve, etc. One commercially available example of flow control valve is the MKS Instruments Model-248.

A three-way valve 209 selectively exhausts gas from process flow path 214a to the process chamber 215 or to the effluent outlet 252. The valve 209 switches between the process chamber 215, or the effluent outlet 252, or neither outlet path ("off") in response to electrical signals received from the electronics module 213 over a line 209a.

Electronics Module

The electronics module 213 controls the electrically activated components of the flow path 214, and also receives data from components capable of electrically reporting measurement and status information. The electronics module 213 exchanges information with a data input/output source (not shown) via an interface 260. The data input/output source may be a human user, control system, host computer system, communications network, etc. Depending upon cost, user sophistication, and other requirements of the application, the interface 260 may include various components. In the case of a human user, these components may be a keyboard, keypad, video screen, computer monitor, computer mouse, trackball, digitizing pad, voice activation software, foot pedals, dials, knobs, switches, etc. In the case of an electronic or mechanized user, the components of the interface 260 may comprise a wire, buss, telephone modem, radio frequency, microwave or infrared link, computer network, or other equipment.

Figure 5:
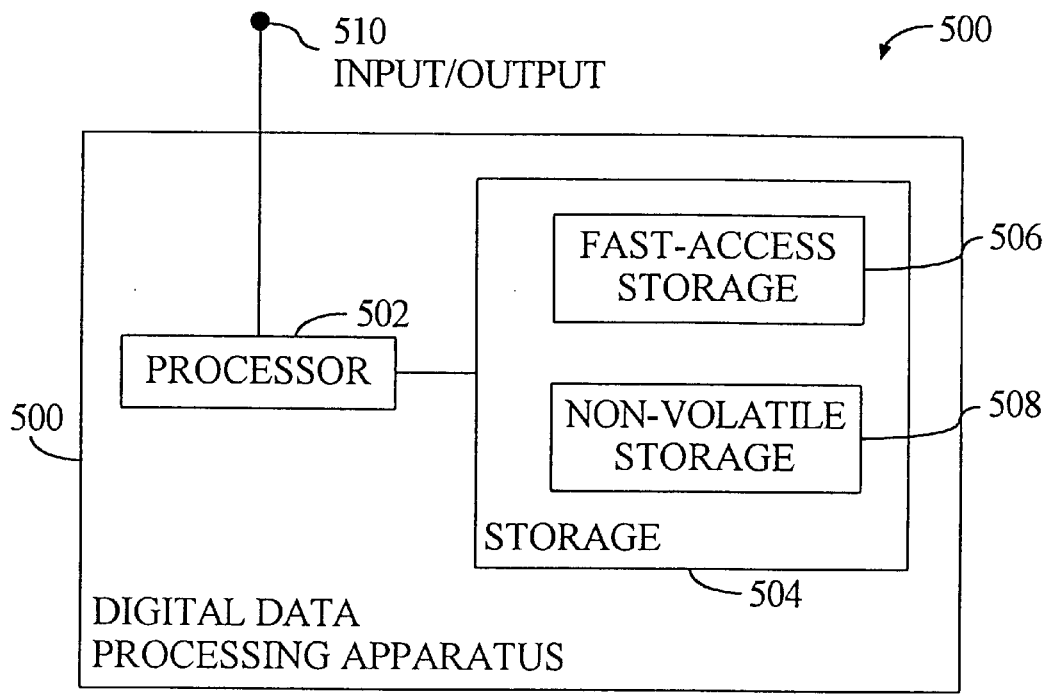
FIG. 5 is a block diagram of a digital data processing machine in accordance with the invention.

The electronics module 213 itself may be implemented in different ways. In one embodiment, the electronics module 213 may be implemented using a digital data processing apparatus. This apparatus may be embodied by various hardware components and interconnections; one example is the digital data processing apparatus 500 (FIG. 5). The apparatus 500 includes a processor 502, such as a microprocessor or other processing machine, coupled to a storage 504. In the present example, the storage 504 includes a fast-access storage 506, as well as nonvolatile storage 508. The fast-access storage 506 may comprise random access memory (RAM), and may be used to store the programming instructions executed by the processor 502. The nonvolatile storage 508 may comprise, for example, read-only memory (ROM), reprogrammable ROM, compact disk, or one or more magnetic data storage media such as a "hard drive," floppy disk, or tape drive, or any other suitable storage device. The apparatus 500 also includes an input/output 510, such as a line, bus, cable, electromagnetic link, or other means for the processor 502 to exchange data with other hardware external to the apparatus 500.

To support communications with analog devices in the system 200, the electronics module 213 may further include one or more analog-to-digital converters and digital-to-analog converters (not shown). Such converters are, however, unnecessary if the valves and sensing devices in the system 200 have digital inputs/outputs.

Despite the specific foregoing description, ordinarily skilled artisans (having the benefit of this disclosure) will recognize that the digital data processing apparatus discussed above may be implemented in a machine of different construction, without departing from the scope of the invention. As a specific example, one of the components 506, 508 may be eliminated; furthermore, the storage 504 may be provided on-board the processor 502, or even provided externally to the apparatus 500.

Furthermore, in contrast to the digital data storage apparatus 500 (FIG. 5), the electronics module 213 may be implemented by logic circuitry, instead of computer-executed instructions. Depending upon the particular requirements of the application in the areas of speed, expense, tooling costs, and the like, this logic circuitry may be implemented by constructing an application specific integrated circuit (ASIC) having thousands of tiny integrated transistors. Such an ASIC may be implemented using CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Exemplary Construction

In one exemplary construction, the flow path 214 may be constructed by forming a unitary block assembly (not shown) with flow paths and internal cavities that are machined into the block. Optionally, one or more of these features may be formed by machining channels and cavities that are encased beneath a cover plate, welded to the block assembly. Such integrated flow paths may be desirable from the standpoint of cost efficiency. If desired, the block assembly may avoid the use of metal seals in order to avoid leakage and reduce costs. The block assembly may be made from stainless steel, Inconel, Hasteloy, VIMNAR, aluminum or another suitable material with sufficient immunity to corrosion, strength, hardness, surface characteristics, etc. In order to simplify construction, the flow path 214b and the associated components may be constructed separately from the block assembly, thereby permitting side-by-side attachment to the flow path 214a and its components.

In this embodiment, the block assembly may include four plumbing fittings providing the inlet 258, inlet 256, port to the process chamber 215, and port to the effluent 252. Fittings integral to the block assembly may, for example, be compatible with standard metal seal valve connections known and commonly used in the industry.

The block assembly may be provided with appropriate mounting hardware for any components that are to be detachable, such as for service and/or replacement. For instance, provisions for mounting any one or all components 201–212 may be made to allow replacement of these devices for service. The calibration volume 203 in this embodiment comprises a machined cavity within the block assembly or canister removably mounted. The flow restrictor 206 may be machined, permanently mounted within the block assembly, or removably mounted, depending upon the particular application.

Different Embodiment

Figure 3:
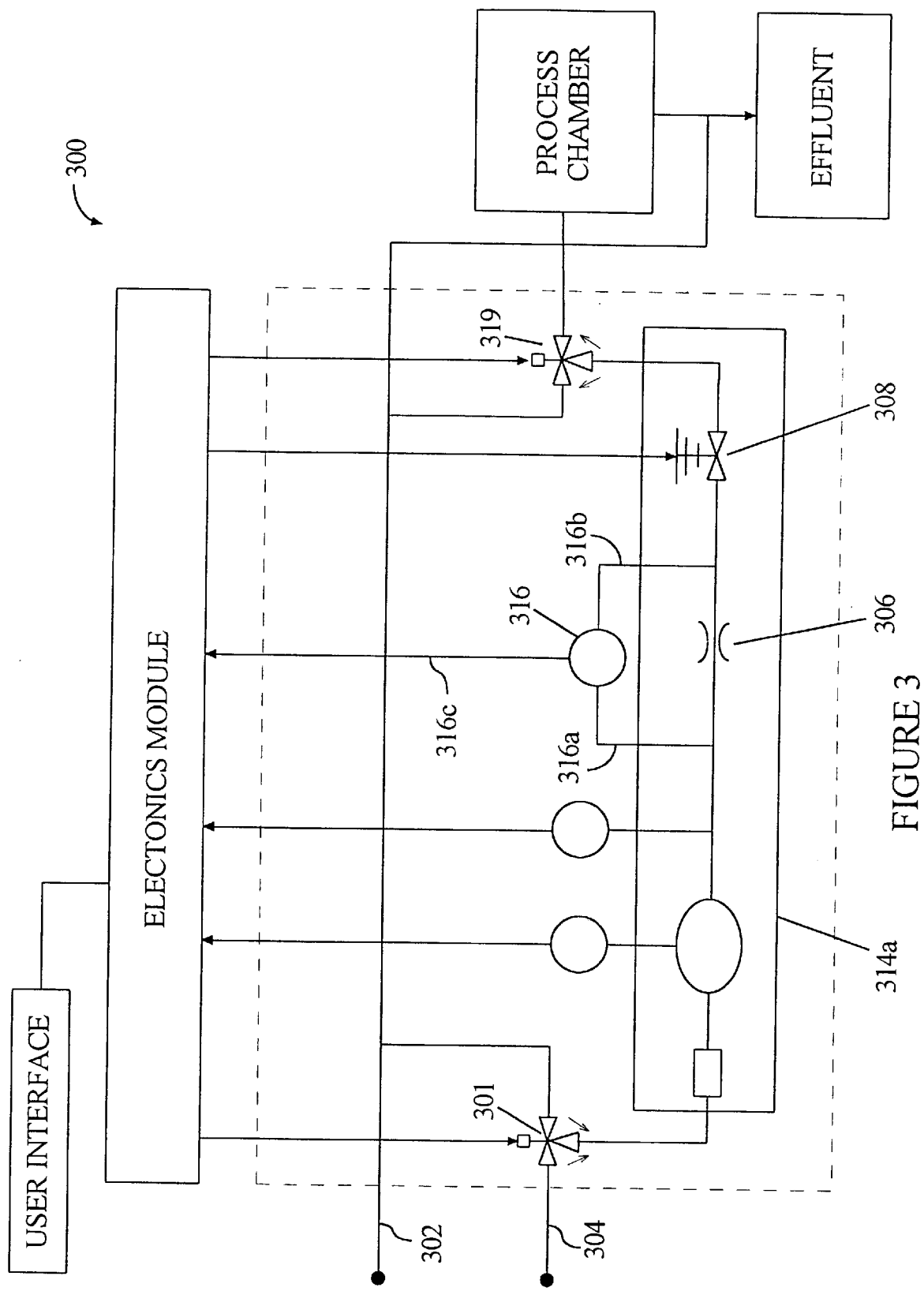
FIG. 3 is a block diagram showing the hardware components and interconnections of a different embodiment of gas delivery mass flow control system, where a differential pressure transducer is mounted in parallel with the flow restrictor, in accordance with the invention.

FIG. 3 shows one alternative to the system 200, where a single sensor 316 is used instead of the dual transducers 205, 207. Depending upon the needs of the application, this implementation may be preferred over the system 200 because it reduces costs and simplifies the design by omitting the reference conduit 261 and using a less complicated pressure transducer.

As with the system 200 (FIG. 2), the sensor 316 of the system 300 (FIG. 3) is connected across a flow restrictor 306. However, the sensor 316 does not utilize any reference pressure. Accordingly, much of the utility gas flow path of FIG. 2 is absent. As one example, the transducer 316 may comprise a single differential pressure transducer such as a diaphragm type device.

In this arrangement, the utility gas inlet 302 is routed to the three-way valve 301, which selectively admits the utility gas (from the inlet 302) or process gas (from the inlet 304) into the process gas path 314 a or shuts off both inlet gases. At the downstream end, the three-way valve 319 selectively routes gas from the process gas flow path 314a to the process chamber or the effluent outlet or shuts off both outlet paths.

In still another embodiment (not shown), the flow restrictor 306 and pressure sensor 316 may be replaced with a thermal mass flow sensor, which uses a capillary tube as discussed above. In this embodiment, the capillary tube constitutes a flow restrictor. Yet another variation replaces units 306, 308, 316 with a thermal mass flow controller.

Multi-Path Gas Flow System with Separate Calibration Volumes

As an alternative design, each of the systems 200, 300 (FIGS. 2–3) may be constructed with multiple process gas flow paths in parallel. In the case of the system 200, for example, duplicates of the components 201–210 and the interconnecting conduit may be constructed to create duplicate process gas flow paths. These duplicate paths (not shown) may share utility gas inlet 258, process chamber outlet 254 and effluent outlet 252, with each having its own unique process gas inlet 256. This embodiment provides a means of selectively supplying accurately controlled amounts of mass flow rate of more than one gas type to the process chamber 215 either separately or in combination. Analogous modifications may be made to the system 300 (FIG. 3).

Multi-Path Gas Flow System With Shared Calibration Volume

Figure 4:
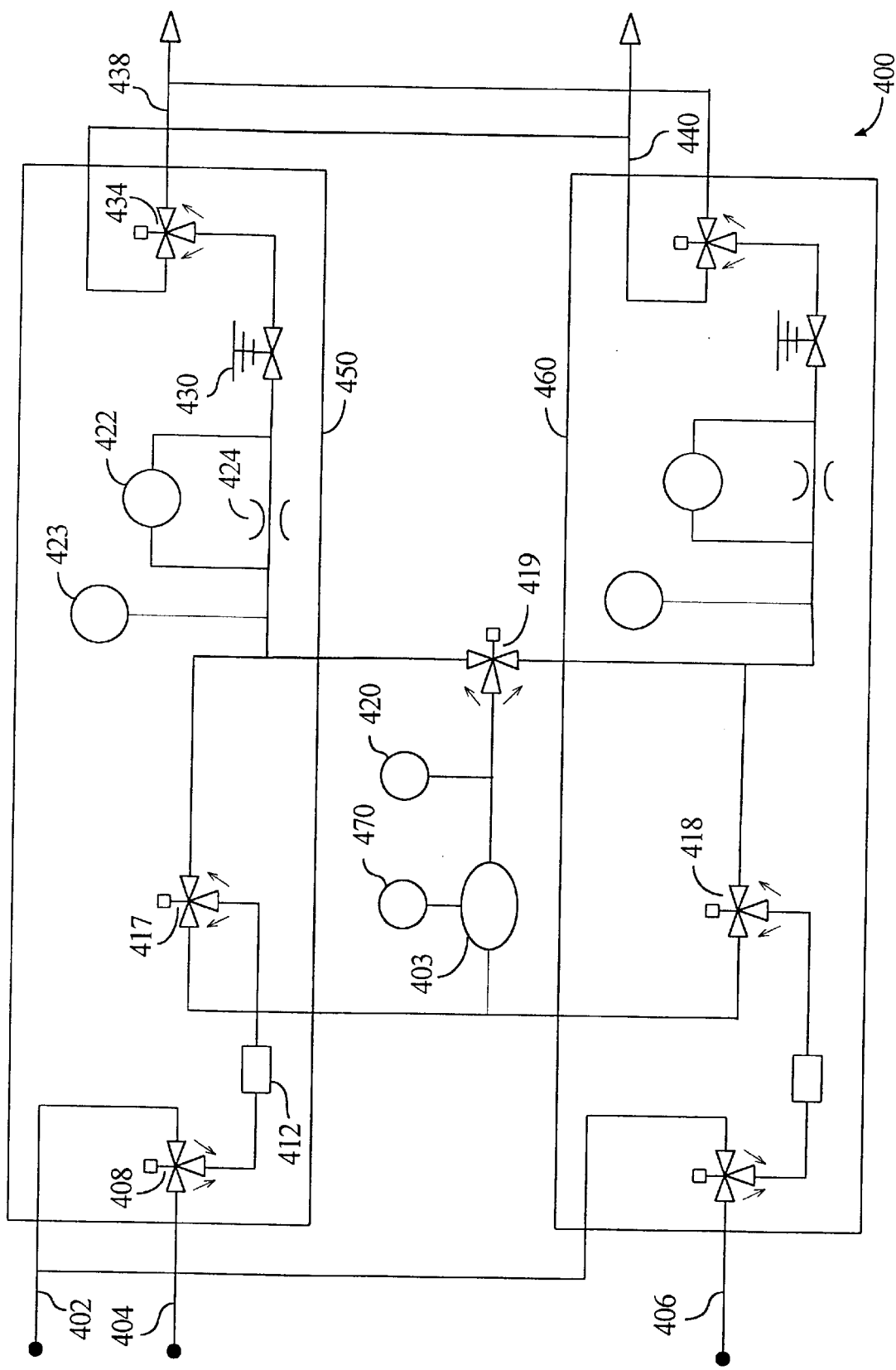
FIG. 4 is a block diagram showing the hardware components and interconnections of a gas flow controller with multiple paths and shared reference volume to carry different process gasses, in accordance with the invention.

As an alternative to the systems of FIGS. 2–3, FIG. 4 shows a system 400 that shares one calibration volume among two process gasses. Although this example uses two process gasses, ordinarily skilled artisans (having the benefit of this disclosure) will recognize that the invention also includes adaptations of the system 400 to include a greater number of process gasses or even a single process gas supplied to multiple locations such as more than one process chamber.

The system 400 includes first and second process gas paths 450, 460. A calibration volume 403, temperature sensor 470, and absolute pressure sensor 420 are shared among the two paths 450, 460. These components may comprise similar devices as discussed above.

The first path 450 includes an inlet 404 to receive a first process gas, and an inlet 402 to receive a utility gas. A three-way valve 408 selectively admits one, the other or neither gas from the inlets 402, 404 to a filter 412. Downstream of the filter is another three-way valve 417, which can either (1) direct inlet gas to the calibration volume 403 and other associated hardware by routing gas to the left (as shown), or (2) bypass the calibration volume 403 by directing gas to the right (as shown).

Downstream of the calibration volume 403 and associated hardware is a three-way valve 419. The valve 419 selectively routes gas from the calibration volume 403 back to one of the paths 450, 460. The remaining components in the first path 450 include a flow restrictor 424 with (1) a differential pressure sensor 422 mounted in parallel, (2) an absolute pressure sensor 423 mounted upstream of the flow restrictor 424, and (3) an adjustable flow control valve 430 mounted downstream. These components have similar construction and function as discussed above in other embodiments. The path 450 also includes a three-way valve 434, which selectively directs gas to the process chamber 438 or effluent outlet 440.

The system 400 depicts the components 422, 423, 424, 430 to illustrate an example applicable to laminar flow applications. Nonetheless, (1) the absolute pressure sensor 423 can be omitted as applicable for molecular flow applications, (2) the differential pressure sensor 422 can be omitted applicable for sonic flow applications, or (3) the components 422, 423, 424, 430 can be replaced with a thermal mass flow controller.

The second path 460 includes similar components, and is similarly capable of directing gas into the shared calibration volume 403, or not. Like the path 450, the path 460 can also selectively direct gas to the process chamber outlet 438 or the effluent outlet 440.

Although the first and second paths 450, 460 are shown with an identical arrangement of like components, the paths 450, 460 may be different. To best suit the application at hand, one path may have components that are arranged in a different order, more or less components than the other, etc.

In another mode of operation, the system 400 may be configured so that gas bypasses the calibration volume 403 and flows directly through the flow restrictor 424 of the path 450. The system 400 may be similarly configured so that gas by passes the calibrator volume 403 and flows directly through the flow restrictor of the path 460.

Alternative Arrangements

Molecular Flow

Referring now to example embodiment 200 (FIG. 2), the positions of the flow control valve 208 and units 205/206/207 may be swapped when the process gas can be conditioned to exhibit molecular flow within the flow restrictor 206. This embodiment is useful for low pressures, where the flow restrictor 206 comprises a molecular flow element.

Analogously, referring to example embodiment 300 (FIG. 3), the positions of the flow control valve 308 and units 306/316 may be swapped for similar molecular flow application.

Sonic Flow

Referring now to example embodiment 300 (FIG. 3), the flow control valve 308 and units 306/316 may be swapped in position for applications where the process gas can be conditioned to exhibit choked viscous flow ("sonic flow"), where the pressure upstream of flow restrictor 306 is greater than twice the downstream pressure. In this embodiment, the control valve 308 is placed upstream of the flow restrictor 306, and the differential pressure sensor 316 is replaced by an absolute pressure sensor (also not shown) connected in flow path 314a between control valve 308 and flow restrictor 306. In this configuration, flow restrictor 306 is designed to act as a sonic nozzle and real-time flow measurement is affected by measuring absolute pressure upstream of the flow restrictor in applications where this pressure is at least twice that of the pressure downstream of the flow restrictor. Mass flow is determined by applying appropriate sonic, or choked flow formulae which show mass flow rate directly proportional to upstream pressure and the conductance of the flow restrictor 306 in sonic flow.

OPERATION

In addition to the various hardware embodiments described above, a different aspect of the invention concerns a method for operating a wide range mass flow controller with real time flow measurement and correction, and optional flow regulation.

Signal-Bearing Media

In one example, this method may be implemented by operating the electronics module 213 (FIG. 2), as embodied by a digital data processing apparatus 500 (FIG. 5), to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to operate a wide range mass flow controller with real time flow measurement and correction.

Figure 6:
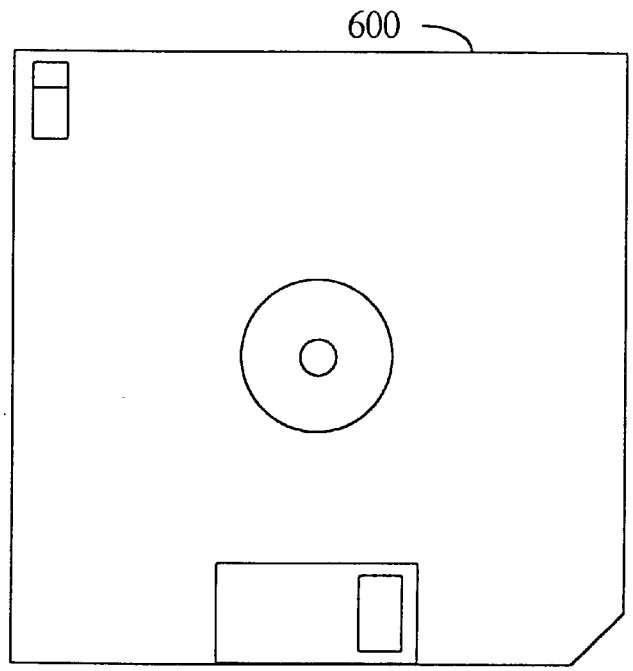
FIG. 6 shows an exemplary signal-bearing medium in accordance with the invention.

This signal-bearing media may comprise, for example, RAM (not shown) contained within the fast access storage 506 (FIG. 5) of the represented electronics module 213 (FIG. 2). Alternatively, the instructions may be contained in another signal-bearing media, such as a magnetic data storage diskette 600 (FIG. 6), directly or indirectly accessible by the data processor 502. Whether contained in the apparatus 500, electronics module 213, or elsewhere, the instructions may be stored on a variety of machine-readable data storage media, such as direct access storage (e.g., a conventional "hard drive", redundant array of inexpensive disks (RAID), or another direct access storage device (DASD)), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the electronics module 213, and is configured to perform operations to implement the method of the invention. The logic circuitry may be implemented using many different types of circuitry, as discussed above.

Operational Sequences: Introduction

Broadly, the invention concerns a method of operating a gas delivery system to accurately measure mass flow, and may be further implemented to supply a precisely regulated flow of gas. First, the calibration volume is charged to a prescribed level. The charged calibration volume provides the initial supply of gas for delivery. Then, various valves are opened to discharge gas from the calibration volume into flow lines, and ultimately downstream into the pressure chamber 215. Initially, a target mass flow rate is input, computed, or otherwise established.

Then, while gas flows through the system, the mass flow rate is carefully monitored (and optionally adjusted) as follows. On repeated occasions, various fluid characteristics are measured downstream of the calibration volume. These characteristics may be absolute gas pressure, differential gas pressure, a combination of these or other measurements representative of mass flow rate. Gas mass flow rate is determined using these fluid characteristics, and then (optionally) adjusted to maintain the target mass flow rate.

Also on repeated occasions, the actual mass flow rate out of the calibration volume is measured. These measurements may be made, for instance, using temperature and pressure sensors mounted at the calibration volume or in close proximity so as to be operationally connected. If the actual mass flow rate and measured mass flow rate differ by more than a prescribed amount, the method of measuring mass flow rate (e.g., related fluid characteristic values) is adjusted to correct the discrepancy. Accordingly, next time downstream fluid characteristics are measured, the downstream mass flow rate measurement (now corrected) will be used to adjust the mass flow rate to meet the target mass flow rate, thereby compensating for the former discrepancy.

In addition to measuring and regulating gas flow, the invention also contemplates the reduced steps of measuring gas flow using the techniques illustrated herein, without adjusting gas flow. However, for completeness of illustration, the following description uses FIGS. 7A–7B to show an embodiment for measuring and regulating gas flow.

Sequence of Operation

Figure 7A:
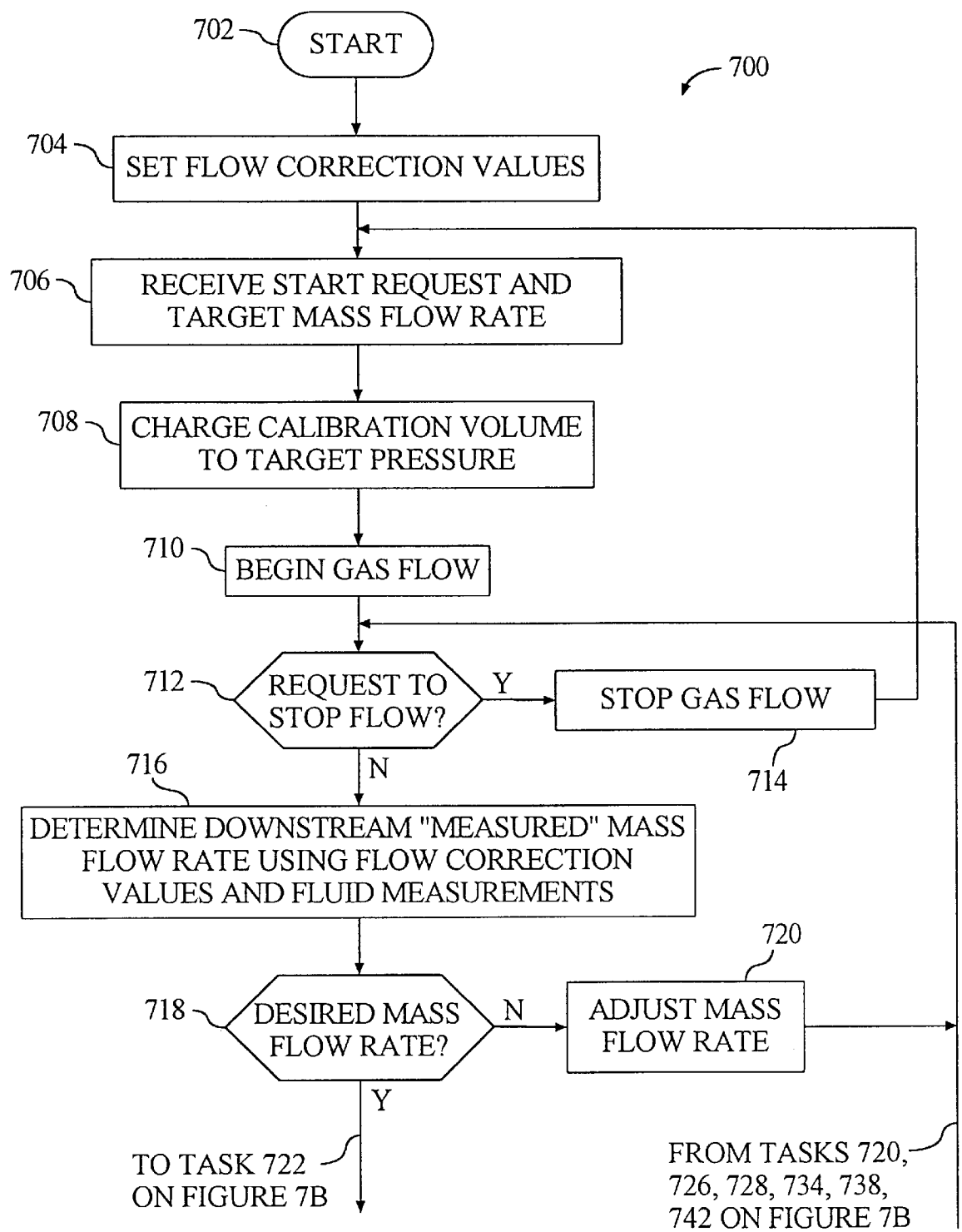
FIGS. 7A–7B depict a flowchart of an operational sequence for operating a gas delivery mass flow control system by managing downstream mass flow, in accordance with the invention.
Figure 7B:
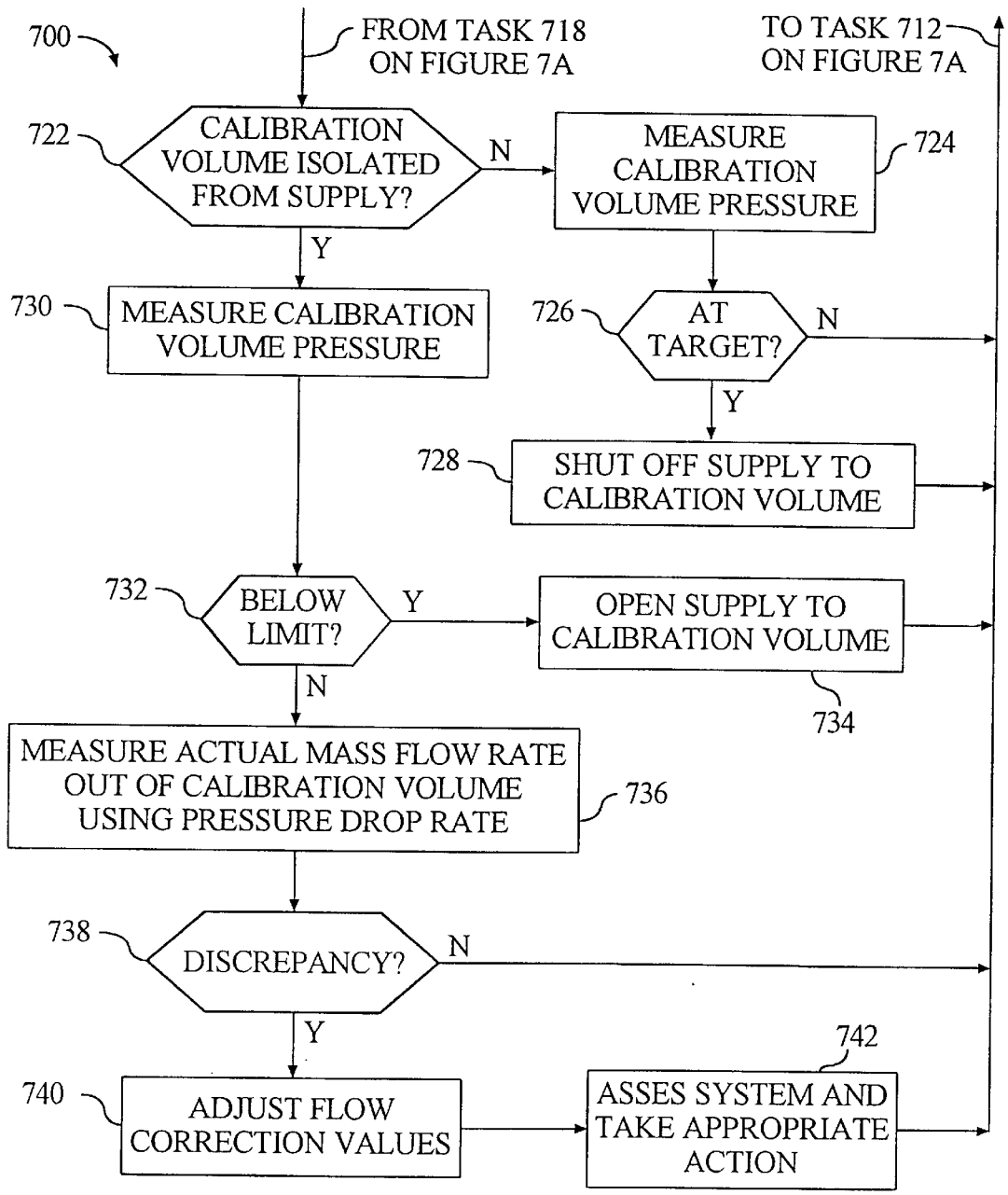

FIGS. 7A–7B show an operating sequence 700 to illustrate one example of the foregoing method. This technique regulates gas flow by determining a "measured" mass flow rate downstream of the calibration volume, and repeatedly correcting flow to maintain a mass flow rate equal to the target mass flow. At certain times, measurements at the calibration volume are taken to determine actual mass flow, and the actual mass flow used to perform "on the fly" adjustment to the calculation of measured mass flow rate to derive a "corrected" measured mass flow rate.

For ease of explanation, but without any intended limitation, the example of FIGS. 7A–7B is described in the specific context of the system 200 of FIG. 2, described above.

The linear iterative process depicted in FIGS. 7A–7B is only used to demonstrate the logical components of the process enacted by electronics module 213 and is not intended to exclude other methods of implementation such as a preemptive interrupt driven operation system, a multi-tasking operating system, an object-oriented real-time kernal application or other method of affecting the processing tasks in order to achieve similar flow behavior as depicted in this example.

After the operations 700 are initiated in step 702, step 704 establishes certain flow correction values, which are used in the computation of measured mass flow rate at the flow restrictor 206. These values and their use are discussed in further detail below. Advantageously, these values may be changed to differently measure downstream mass flow, in order to correct for errors as indicated by an "actual" mass flow determined at the calibration volume. After step 704, the electronics module 213 receives specification of a desired or "target" mass flow (step 706). This value may be received via the interface 260 from an operator, control system, computer network, etc., or recalled from volatile or nonvolatile memory contained within electronics module 213. The target mass flow rate may be in units of standard cubic centimeters per minute (sccm) or standard liters per minute (slm), for example.

After step 706, step 708 charges the calibration volume 203 to a target pressure. This is achieved by the electronics module 213 sending appropriate commands to close the shutoff valve 209, if not already closed, and to configure the three-way valve 201 to direct the process gas from the inlet 256 to the calibration volume 203. The target pressure for the calibration volume is selected according to the required process pressure, calibration volume size, desired length of time of gas flow, desired flow rate, etc. Alternatively, step 708 can be performed prior to step 706 without materially impacting this process.

In the illustrated embodiment, step 708 also calibrates the floating-reference differential pressure transducers 205/207. Namely, the electronics module 213 issues appropriate instructions to open the flow control valve 211 to admit a sufficient pressure of utility gas to balance the back side pressure on each transducer's diaphragm with the opposing front side pressure, and thereby "zero out" the transducers 205, 207. Since each transducer 205, 207 provides a pressure output relative to the gas pressure in the reference conduit 261, step 708 involves changing the pressure in the reference conduit 261 until the transducers 205, 207 both read approximately zero. If one transducer reads slightly higher or lower than the other due to manufacturing imperfections or other reasons, utility gas pressure may be adjusted to provide an average pressure of zero among the transducers 205, 207. This reference pressure can be set once as just described, or optionally, this reference pressure can be controlled throughout the entire process to provide an average pressure of zero among transducers 205, 207.

After step 708, step 710 begins gas flow. This is achieved by the electronics module 213 opening the three-way valve 209 to the process chamber 215 and slightly opening the flow control valve 208. Step 712 represents the entry point of a processing loop whereby each iteration begins with the electronics module 213 checking for a signal to stop the gas flow. As an example, the signal to stop the gas flow may originate from the interface 260 when flow is no longer desired. If such a signal is detected in step 712, step 714 stops the flow of gas by closing the three-way valve 209. After step 714, the electronics module 213 transitions to step 706 and waits for the next signal to begin gas flow.

If step 712 determines that there is no signal instructing the termination of gas flow, in step 716 the transducers 205, 207 measure differential pressure across the flow restrictor 206 and the transducer 204 measures the absolute pressure upstream of the flow restrictor 206. Step 716 then determines the mass flow rate based upon these pressures. This computation may be done according to the Hagen-Poiseuille equation for laminar flow, shown in Equation 1 below:

$$Q = K_1 C P_1 (P_3 - P_2) \qquad [1]$$

where:
Q=mass flow
$K_1$=a constant
C=conductance
$P_1$=average pressure
$P_3$=inlet pressure, from the transducer 205
$P_2$=outlet pressure, from the transducer 207

For the purposes of illustration, application in the laminar flow regime has been assumed for this example. For applications in the molecular flow regime, $P_1$ in Equation 1 is omitted and $K_1$ assumes a different value. Also, for applications in the sonic flow regime, $P_1$ $P_2$ and $P_3$ are omitted and $K_1$ assumes a different value. In this case, $P_3$ is measured by the absolute pressure sensor 204 to ensure sonic conditions.

Step 716 also applies the flow correction values in order to yield a final measurement of mass flow that has been corrected pursuant to any preceding "actual" mass flow determinations at the calibration volume. As one example, this computation may be done by applying the flow correction values in a formula such as that shown in Equation 2 below. Other formulae may alternatively be used such as piece-wise linear, quadratic, polynomial, interpolation lookup table, various combinations of these and other commonly used methods for correcting numeric measurement errors.

$$Q = mQ_1 + b \qquad [2]$$

where:
Q=corrected mass flow rate
$Q_1$=measured mass flow rate
m=scale correction
b=offset correction Adjustment of the flow correction values is discussed in greater detail below. In step 718, the electronics module 213 determines whether the corrected measured mass flow matches the target mass flow. If not, step 720 increases or decreases gas flow, and returns to step 712. As an example, gas flow may be increased and decreased by changing the control signal to control valve 208 in small, predetermined increments. Alternatively, steps 716, 718, 720 may be implemented non-incrementally using an analog servo loop, or digital implementation of a servo loop.

When the target mass flow is reached, step 718 advances to step 722, which determines whether or not the calibration volume 203 is isolated from the process gas inlet 256 via three-way valve 201. If the calibration volume 203 is not isolated from the process gas inlet 256, it is being recharged. In this case, step 724 measures the pressure of the calibration volume 203 by reading the pressure sensor 204. Then, step 726 compares the pressure measured in step 724 to the target pressure (described above in step 708) to determine if the calibration volume 203 has reached the desired pressure, in which case, the electronics module 213 closes the three-way valve 201 in step 728. In either case, processing loops back to step 712.

If, however, step 722 determines that the calibration volume 203 is isolated from the process gas inlet 256 and therefore actively dropping in pressure as gas flows from it, then the pressure sensor 204 measures the pressure in the calibration volume 203 in step 730. This is followed by step 732, which evaluates this pressure to determine whether or not it is below the value considered too low for proper performance of the downstream flow measurement and control. This determination is based on a variety of considerations involving the design of the flow path 214 a and related components as well as upstream and downstream pressures, mass flow rate and other factors. If step 732 determines that the pressure in the calibration volume 203 is below limit, then step 734 opens the three-way valve 201 to the process gas inlet 256 and begins recharging the calibration volume pressure. As an alternative to the foregoing iterative description, steps 722–734 may be implemented non-incrementally using an analog servo loop, or digital implementation of a servo loop.

If, on the other hand, step 732 determines that the pressure in calibration volume 203 is within acceptable limits, step 736 measures the mass flow rate out of the calibration volume 203. Mass flow rate out of the calibration volume 203, called "actual flow rate", is computed according to Equation 3, below, based on the Ideal Gas Law:

$$Q = \frac{K_2 V dP}{T dt} \qquad [3]$$

where:
Q=mass flow rate
$K_2$=a constant (with a negative value)
V=volume of calibration volume 203
T=temperature in calibration volume 203

$\frac{dP}{dt}$ = time rate of change of pressure at calibration volume 203

The time rate of change of pressure at the calibration volume 203 is found by taking the difference of successive measurements of the transducer 204 and dividing by the time interval between the successive measurement points in time as determined by a clock or other time reference component (not shown) accessible by the electronics module 213. Optionally, several measurements may be averaged. The temperature of the gas in the calibration volume 203 is determined by reading the measurement from temperature sensor 210, or by using a predetermined or assumed temperature such as ambient temperature.

After step 736, step 738 determines whether there is any discrepancy between (1) the measurement of "actual" mass flow rate out of the calibration volume (step 736), and (2) the "measured" mass flow rate through the flow restrictor 206, as indicated by the absolute pressure sensor and differential pressure sensor (step 716). Depending upon the requirements of the application, a "discrepancy" may occur when the actual and measured gas flow differ by any amount whatsoever, a percentage of actual flow, a fixed number such as 0.01 sccm, etc. If there is no discrepancy, step 738 returns to step 712.

If there is a discrepancy, step 740 calculates an update to the flow correction values. This is achieved using Equation 2 in the reverse or alternatively reversing whatever equation or equations are used in step 716 to correct the measured mass flow. Following step 740, step 742 assesses the performance of the system 200, and takes any action deemed appropriate. In one embodiment, the assessment of step 742 evaluates current flow calibration against past data to predictively detect impending reliability problems due to contamination, transducer drift, impurities found in the process gas, needed maintenance, etc. For example, a requirement for higher and higher downstream differential pressure may indicate a clogged flow restrictor 206, or widely varying flow correction values may indicate a pressure measurement or other systemic problem. The assessment may also determine whether any action is due under a user selected maintenance schedule. If the assessment of step 742 reveals problems, appropriate action is taken which may include, for example, temporarily shutting down the system 200, sending an alarm or warning to an operator or control system via the interface 260, performing schedule or unscheduled maintenance, ending the routine 700 if the supply of gas from the process gas inlet 256 is too low to maintain the desired mass flow, etc. IF step 742 does not reveal any problems, control returns to step 712, discussed above.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method of measuring mass flow in a gas delivery system, comprising operations of:
    charging a calibration volume with a process gas;
    starting a flow of the process gas from the calibration volume into a flow path; during gas flow,
        repeatedly utilizing one or more sensors downstream of the calibration volume to take pressure measurements and performing a computational process using data including the pressure measurements to compute a measured mass flow rate through a flow restrictor in the path;
        repeatedly performing operations comprising: measuring pressure and determining the temperature of the gas in the calibration volume, using a time rate of change of the measured pressure and the determined temperature to compute an actual mass flow rate of gas flowing from the calibration volume, and determining whether there is any discrepancy between the actual mass flow rate and the measured mass flow rate; and
    whenever a discrepancy is found, correcting the computational process such that the measured mass flow rate matches the actual mass flow rate thereby eliminating the discrepancy.

2. The method of claim 1, the operation of utilizing one or more sensors downstream of the calibration volume to take pressure measurements comprising:
    using one or more pressure sensors mounted about the flow restrictor to measure differential pressure.

3. The method of claim 1, the operation of utilizing one or more sensors downstream of the calibration volume to take pressure measurements comprising:
    using one or more pressure sensors mounted about the flow restrictor to measure differential pressure and additionally measuring average absolute pressure at the flow restrictor.

4. The method of claim 3, where the pressure sensors comprise a floating reference differential pressure sensor including a first transducer attached to the flow path upstream of the flow restrictor and a second transducer attached to the flow path downstream of the flow restrictor, each transducer additionally receiving a back side reference pressure from a reference conduit, the operations further comprising:
    before initiating gas flow, calibrating the differential pressure sensor by applying sufficient pressure to the transducers via the reference conduit so that each transducer provides a pressure output of approximately zero.

5. The method of claim 1, the operation of utilizing one or more sensors downstream of the calibration volume to take pressure measurements comprising:

using an absolute pressure sensor mounted upstream of the flow restrictor in the path to measure absolute pressure.

6. The method of claim 1, the operation utilizing one or more sensors downstream of the calibration volume to take pressure measurements being performed with a mass flow sensor comprising a capillary thermal mass flow sensor.

7. The method of claim 1, further comprising:

repeatedly adjusting gas flow until the measured mass flow rate matches a prescribed target mass flow rate.

8. The method of claim 7, where the operation of adjusting gas flow until the measured mass flow rate matches the target mass flow rate comprises:

using an analog servo loop to adjust gas flow until the measured gas flow rate arrives at the target mass flow rate.

9. The method of claim 7, where the operation of adjusting gas flow until the measured mass flow rate matches the target mass flow rate comprises:

repeating operations comprising: incrementally adjusting gas flow and then re-computing the measured mass flow rate until the target gas flow rate is reached.

10. The method of claim 1, the operation of determining whether there is any discrepancy between actual mass flow rate and the measured mass flow rate comprising:

determining a difference between actual mass flow rate and the target mass flow rate, and if the difference surpasses prescribed threshold deeming a discrepancy to exist.

11. The method of claim 1, where:

the sensors include one or more pressure sensors downstream of the calibration volume; and the computational process comprises applying a prescribed mathematical equation to the pressure measurements to compute measured mass flow rate.

12. The method of claim 11, the operation of correcting the computational process being performed by changing the mathematical equation.

13. A signal-bearing medium tangibly embodying a program of machine-readable instructions executable by a digital processing apparatus to perform operations for operating a gas delivery system to measure mass flow, the operations comprising:

charging a calibration volume with a process gas;

starting a flow of the process gas from the calibration volume into a flow path; during gas flow, repeatedly utilizing one or more sensors downstream of the calibration volume to take pressure measurements and performing a computational process using data including the pressure measurements to compute of a measured mass flow rate through a flow restrictor in the path;

repeatedly performing operations comprising: measuring pressure and determining the temperature of the gas in the calibration volume, using a time rate of change of the measured pressure and the determined temperature to compute an actual mass flow rate of gas flowing from the calibration volume, and determining whether there is any discrepancy between the actual mass flow rate and the measured mass flow rate; and whenever a discrepancy is found, correcting the computational process such that the measured mass flow rate matches the actual mass flow rate thereby eliminating the discrepancy.

14. The medium of claim 13, the operation of utilizing one or more sensors downstream of the calibration volume to take pressure measurements comprising:

using one or more pressure sensors mounted about the flow restrictor to measure differential pressure.

15. The medium of claim 13, the operation utilizing one or more sensors downstream of the calibration volume to take pressure measurements comprising:

using one or more pressure sensors mounted about the flow restrictor to measure differential pressure and additionally measuring average absolute pressure at the flow restrictor.

16. The medium of claim 15, where the pressure sensor comprises a floating reference differential pressure sensor including a first transducer attached to the flow path upstream of the flow restrictor and a second transducer attached to the flow path downstream of the flow restrictor, each transducer additionally receiving a back side reference pressure from a reference conduit, the operations further comprising:

before initiating gas flow, calibrating the differential pressure sensor by applying sufficient pressure to the transducers via the reference conduit so that each transducer provides a pressure output of approximately zero.

17. The medium of claim 13, the operation of utilizing one or more sensors downstream of the calibration volume to take pressure measurements comprising:

using an absolute pressure sensor mounted upstream of the flow restrictor in the path to measure absolute pressure and computing mass flow using data including the measured absolute pressure.

18. The medium of claim 13, the operation utilizing one or more sensors downstream of the calibration volume to take pressure measurements being performed with a mass flow sensor comprising a capillary thermal mass flow sensor.

19. The medium of claim 13, the operations further comprising:

repeatedly adjusting gas flow until the measured mass flow rate matches the prescribed target mass flow rate.

20. The medium of claim 13, where the operation of adjusting gas flow until the measured mass flow rate matches the target mass flow rate comprises:

using an analog servo loop to adjust gas flow until the measured gas flow rate arrives at the target mass flow rate.

21. The medium of claim 13, where the operation of adjusting gas flow until the measured mass flow rate matches the target mass flow rate comprises:

repeating operations comprising: incrementally adjusting gas flow and then re-computing the measured mass flow rate until the target gas flow rate is reached.

22. The medium of claim 13, the operation of determining whether there is any discrepancy between actual mass flow rate and the measured mass flow rate comprising:

determining a difference between actual mass flow rate and the target mass flow rate, and if the difference surpasses prescribed threshold, deeming a discrepancy to exist.

23. The medium of claim 13, where:

the sensors include one or more pressure sensors downstream of the calibration volume; and the computational process comprises applying a prescribed mathematical equation to the pressure measurements to compute measured mass flow rate.

24. The medium of claim 23, the operation of correcting the computational process being performed by changing the mathematical equation.

25. A logic circuit of multiple interconnected electrically conductive elements configured to perform operations to manage a gas delivery system, the operations comprising:
 charging a calibration volume with a process gas;
 starting a flow of the process gas from the calibration volume into a flow path;
 during gas flow,
  repeatedly utilizing one or more sensors downstream of the calibration volume to take pressure measurements and performing a computational process using data including the pressure measurements to compute of a measured mass flow rate through a flow restrictor in the path;
  repeatedly performing operations comprising: measuring pressure and determining the temperature of the gas in the calibration volume, using a time rate of change of the measured pressure and the determined temperature to compute an actual mass flow rate of gas flowing from the calibration volume, and determining whether there is any discrepancy between the actual mass flow rate and the measured mass flow rate; and
  whenever a discrepancy is found, correcting the computational process such that the measured mass flow rate matches the actual mass flow rate thereby eliminating the discrepancy.

26. The circuit of claim 25, the operation utilizing one or more sensors downstream of the calibration volume to take pressure measurements comprising:
 using one or more pressure sensors mounted about the flow restrictor to measure differential pressure.

27. The circuit of claim 26, where the pressure sensors comprise a floating reference differential pressure sensor including a first transducer attached to the flow path upstream of the flow restrictor and a second transducer attached to the flow path downstream of the flow restrictor, each transducer additionally receiving a back side reference pressure from a reference conduit, the operations further comprising:
 before initiating gas flow, calibrating the differential pressure sensor by applying sufficient pressure to the transducers via the reference conduit so that each transducer provides a pressure output of approximately zero.

28. The circuit of claim 25, the operation utilizing one or more sensors downstream of the calibration volume to take pressure measurements comprising:
 using one or more pressure sensors mounted about the flow restrictor to measure differential pressure and additionally measuring average absolute pressure at the flow.

29. The circuit of claim 25, the operation of utilizing one or more sensors downstream of the calibration volume to take pressure measurements comprising:
 using an absolute pressure sensor mounted upstream of the flow restrictor to measure absolute pressure and computing mass flow using data including the measured absolute pressure.

30. The circuit of claim 25, the operation utilizing one or more sensors downstream of the calibration volume to take pressure measurements being performed with a mass flow sensor comprising a capillary thermal mass flow sensor.

31. The circuit of claim 25, the operations further comprising:
 repeatedly adjusting flow until the measured mass flow rate matches a prescribed target mass flow rate.

32. The circuit of claim 25, where the operation of adjusting gas flow until the measured mass flow rate matches the target mass flow rate comprises:
 using an analog servo loop to adjust gas flow until the measured gas flow rate arrives at the target mass flow rate.

33. The circuit of claim 25, where the operation of adjusting gas flow until the measured mass flow rate matches the target mass flow rate comprises:
 repeating operations comprising: incrementally adjusting gas flow and then re-computing the measured mass flow rate until the target gas flow rate is reached.

34. The circuit of claim 25, the operation of determining whether there is any discrepancy between actual mass flow rate and the measured mass flow rate comprising:
 determining a difference between actual mass flow rate and the target mass flow rate, and if the difference surpasses prescribed threshold, deeming a discrepancy to exist.

35. The circuit of claim 25, where:
 the sensors include one or more pressure sensors downstream of the calibration volume; and
 the computational process comprises applying a prescribed mathematical equation to the pressure measurements to compute measured mass flow rate.

36. The circuit of claim 35, the operation of conditioning measurement by the downstream sensors to correct for the discrepancy being performed by changing the mathematical equation.

37. The circuit of claim 25, where the logic circuit comprises an integrated circuit.

* * * * *

UNITED STATES PATENT AND TRADEMARK OFFICE
CERTIFICATE OF CORRECTION

PATENT NO. : 6,119,710  
DATED : September 19, 2000  
INVENTOR(S) : Timothy R. Brown Page 1 of 1

It is certified that error appears in the above-identified patent and that said Letters Patent is hereby corrected as shown below:

Title,
Between "FLOW" and "WITH" delete "SYSTEM"

Column 11,
Line 34, change "314a" to -- 314a --

Claims,
Column 19, claim 10,
Line 31, change "threshold" to -- threshold, --

Column 19, claim 13,
Lines 54-55, change "compute of a" to -- compute a --

Column 21, claim 25,
Lines 13-14, change "compute of a" to -- compute a --

Signed and Sealed this

Sixth Day of November, 2001

Attest:

NICHOLAS P. GODICI  
Attesting Officer    Acting Director of the United States Patent and Trademark Office